(12) United States Patent
Blanke

(10) Patent No.: US 6,269,090 B1
(45) Date of Patent: Jul. 31, 2001

(54) TELECOMMUNICATION SYSTEM, RADIO SYSTEM, AND METHOD

(75) Inventor: Gero Blanke, Murr (DE)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/086,019

(22) Filed: May 28, 1998

(30) Foreign Application Priority Data

May 29, 1997 (EP) .................................................. 97401186

(51) Int. Cl.⁷ ....................................................... H04J 3/00
(52) U.S. Cl. ........................ 370/336; 455/67.2; 455/91; 455/296; 455/297; 455/278; 455/283
(58) Field of Search .................................. 370/201, 205, 370/347, 350, 503; 455/67.3, 226.2, 226.3, 296, 311; 375/356

(56) References Cited

U.S. PATENT DOCUMENTS

| | | | | |
|---|---|---|---|---|
| 4,683,566 | * | 7/1987 | Sasaki ................................... | 370/225 |
| 5,280,471 | * | 1/1994 | Kondou et al. ....................... | 370/347 |
| 5,430,731 | * | 7/1995 | Umemoto et al. .................... | 370/337 |
| 5,697,056 | * | 12/1997 | Tayloe ................................. | 455/513 |
| 5,845,209 | * | 12/1998 | Iwata ................................... | 455/423 |
| 6,112,100 | * | 8/2000 | Ossoinig et al. ..................... | 455/502 |

FOREIGN PATENT DOCUMENTS

| | | |
|---|---|---|
| 3224922 | 1/1984 | (DE) . |
| 0492531 | 7/1992 | (EP) . |
| 9113502 | 9/1991 | (WO) . |

OTHER PUBLICATIONS

Patent Abstracts of Japan 04291831 (Oct. 15, 1992) and Japanese Patent Application 03057301 (Mar. 20, 1991) (Fujitsu Ltd.).
Patent Abstracts of Japan 06164474 (Jun. 10, 1991) and Japanese Patent Application 04317617 (Nov. 27, 1992) (NEC Corp.).

* cited by examiner

*Primary Examiner*—Hassan Kizou
*Assistant Examiner*—Inder Pal Mehra

(57) ABSTRACT

In known telecommunication systems comprising two separate radio systems each one using its own clock signal for defining its channels multiplexed in time, said radio systems cause too much interference with each other. By introducing a coupling between both radio systems for creating a predefined phase difference between their channels by adjusting at least one of said clock signals, the interference can be reduced, in particular in case said phase difference is continuously altered in time, by increasing or decreasing said phase difference all the time.

10 Claims, 2 Drawing Sheets

TELECOMMUNICATION SYSTEM, RADIO SYSTEM, AND METHOD

BACKGROUND OF THE INVENTION

1. Technical Field

The invention relates to a telecommunication system comprising a first radio system using a first clock signal for defining first channels multiplexed in time, and comprising a second radio system using a second clock signal for defining second channels multiplexed in time.

2. Discussion of Related Art

Such a telecommunication system is of common general knowledge and comprises said first radio system and said second radio system as in for example, well known GSM systems. The first GSM system uses said first clock signal for defining first communication channels multiplexed in time and situated in a first frequency band, and the second GSM system uses said second clock signal for defining second communication channels multiplexed in time and situated in a second frequency band being either equal to said first frequency band or being situated near said first frequency band.

This known telecommunication system is disadvantageous, inter alia, because of said radio systems causing too much interference with each other.

SUMMARY OF THE INVENTION

It is an object of the invention, inter alia, to provide a telecommunication system as described in the technical field, in which said radio systems cause less interference with each other.

Thereto, the telecommunication system according to the invention is characterized in that the telecommunication system comprises a coupling between the first radio system and the second radio system for creating a predefined phase difference between at least one first channel and at least one second channel by adjusting at least one of said first and second clock signal.

Due to the presence of said coupling and the creation of said predefined phase difference as a consequence of said adjustment, the first location of said at least one first channel and the second location of said at least one second channel can be chosen (adjusted) such that interference is at a minimum level.

The invention is based on the insight that said locations of said channels affect their interference.

The problem of said radio systems causing too much interference with each other is thus solved by adjusting at least one of said first and second clock signals via said coupling.

It should be observed that it is of common general knowledge to reduce the interference in two radio systems by introducing a random phase for one of both clock signals. In this case there is no coupling between both radio systems for the creation of a predefined phase difference between both channels as a consequence of an adjustment of clock signals via said coupling.

A first embodiment of the telecommunication system according to the invention is characterized in that said coupling comprises a phase shifting device.

Such a phase shifting device, which receives one of said clock signals and in response generates the other clock signal having a shifted phase, could be located either between both radio systems or inside one of both radio systems.

A second embodiment of the telecommunication system according to the invention is characterised in that said phase shifting device alters a phase of at least one of said first and second clock signals with a constant value.

In this case, the phase shifting device receives one of said clock signals and adds or subtracts a constant value to or from the phase.

A third embodiment of the telecommunication system according to the invention is characterized in that said phase shifting device alters a phase of at least one of said first and second clock signals with a value which is continuously altered in time.

In this case, the phase shifting device receives one of said clock signals and adds or subtracts a value to or from the phase, which value is continuously increasing or decreasing.

The possibility of both radio systems each one having its own clock generator, whereby the coupling is only used for exchanging a control signal for creating said predefined phase difference between said channels by adjusting at least one of said clock signals, should of course not be excluded.

Said coupling between said first and second radio system could, of course, be either a wired one or a wireless one, whereby in the last case for example said second radio system monitors said first channels of said first radio system and derives said first clock signal from said monitored first channels and generates said second clock signal in response to the derived first clock signal by introducing said predefined phase difference.

The invention further relates to a radio system using a clock signal for defining channels multiplexed in time.

The radio system according to the invention is characterized in that the radio system comprises a coupling for a further clock signal belonging to a further radio system using said further clock signal for defining further channels multiplexed in time for creating a predefined phase difference between at least one channel and at least one further channel by adjusting at least one of said clock signal and said further clock signal.

A first embodiment of the radio system according to the invention is characterized in that said coupling comprises a phase shifting device.

A second embodiment of the radio system according to the invention is characterized in that said phase shifting device alters a phase of at least one of said clock signal and said further clock signal with a constant value.

A third embodiment of the radio system according to the invention is characterized in that said phase shifting device alters a phase of at least one of said clock signal and said further clock signal with a value which is continuously altered in time.

The invention yet further relates to a method for providing first radio communication via a first radio system using a first clock signal for defining first channels multiplexed in time, and for providing second radio communication via a second radio system using a second clock signal for defining second channels multiplexed in time.

The method according to the invention is characterized in that the method comprises the steps of supplying at least one of said first and second clock signal respectively to at least one of said second and first radio system respectively, and creating a predefined phase difference between at least one first channel and at least one second channel by adjusting at least one of said first and second clock signal.

A first embodiment of the method according to the invention is characterized in that said step of creating said phase difference comprises a substep of altering a phase of at least one of said first and second clock signal with a value.

From DE 32 24 922, Hoefgen (Standard Elektrik Lorenz AG) it is known to delay irregularly information to be transmitted from a subscribing station to a base station. From WO 91/13502 and corresponding U.S. Pat. No. 5,301,188 (Motorola) shared carrier frequency hopping is known. The invention of creating a predefined phase difference between at least one first channel of a first radio system and at least one second channel of a second radio system is known neither from DE 32 24 922 nor from WO 91/13502. All references including further references cited with respect to and/or inside said references are hereby incorporated by reference in their entirety into this patent application.

BRIEF DESCRIPTION OF THE DRAWINGS

The invention will be explained in greater detail with the help of embodiments disclosed in the drawings, whereby FIG. 1 discloses an overview of a telecommunication system according to the invention including two pairs of timing diagrams defining channels multiplexed in time, and FIG. 2 discloses two radio systems according to the invention comprising two base stations which are mutually coupled via a coupling.

DETAILED DESCRIPTION OF PREFERRED EMBODIMENTS

Figure 1:
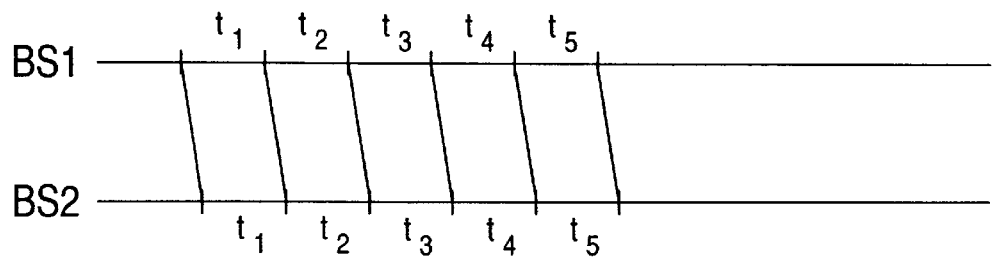
Figure 1:
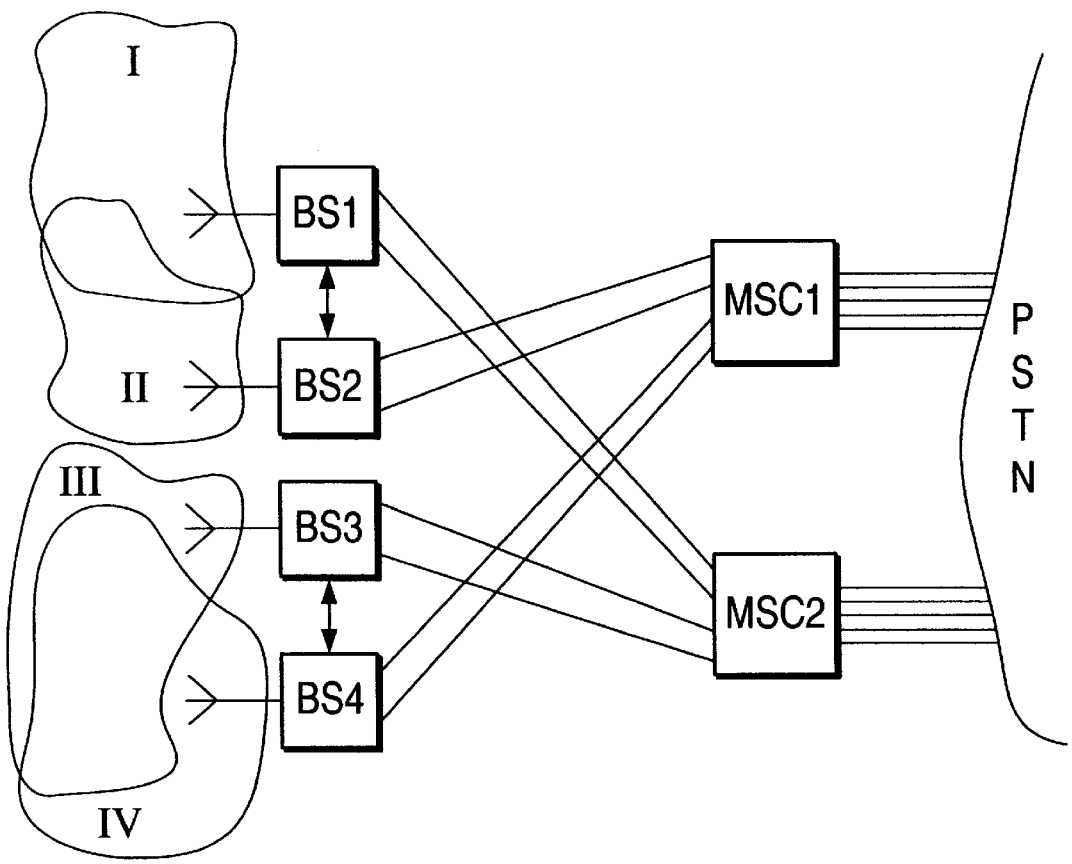
Figure 1:
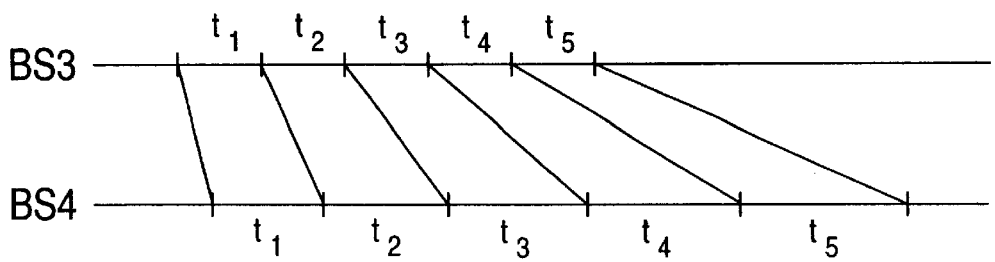

The telecommunication system according to the invention as disclosed in FIG. 1 comprises a Public Switched Telecommunication Network or PSTN, a first Mobile Switching Center or USC1 of which a first side is coupled to said PSTN and of which a second side is coupled to a second Base Station or BS2 for serving a second area II and to a fourth Base Station or BS4 for serving a fourth area IV, and a second Mobile Switching Center or MSC2 of which a first side is coupled to said PSTN and of which a second side is coupled to a first Base Station or BS1 for serving a first area I and to a third Base Station or BS3 for serving a third area III. The first base station BS1 and the second base station BS2 are mutually coupled via a first coupling, resulting in a first pair of timing diagrams defining first channels multiplexed in time of BS1 and second channels multiplexed in time of BS2, said second channels being shifted in phase with 90 degrees with respect to said first channels, and the third base station BS3 and the fourth base station BS4 are mutually coupled via a second coupling, resulting in a second pair of timing diagrams defining third channels multiplexed in time of BS3 and fourth channels multiplexed in time of BS4, each subsequent one of said fourth channels being shifted in phase with an increasing number of degrees with respect to the previous fourth channel and with respect to said third channels.

Figure 2:
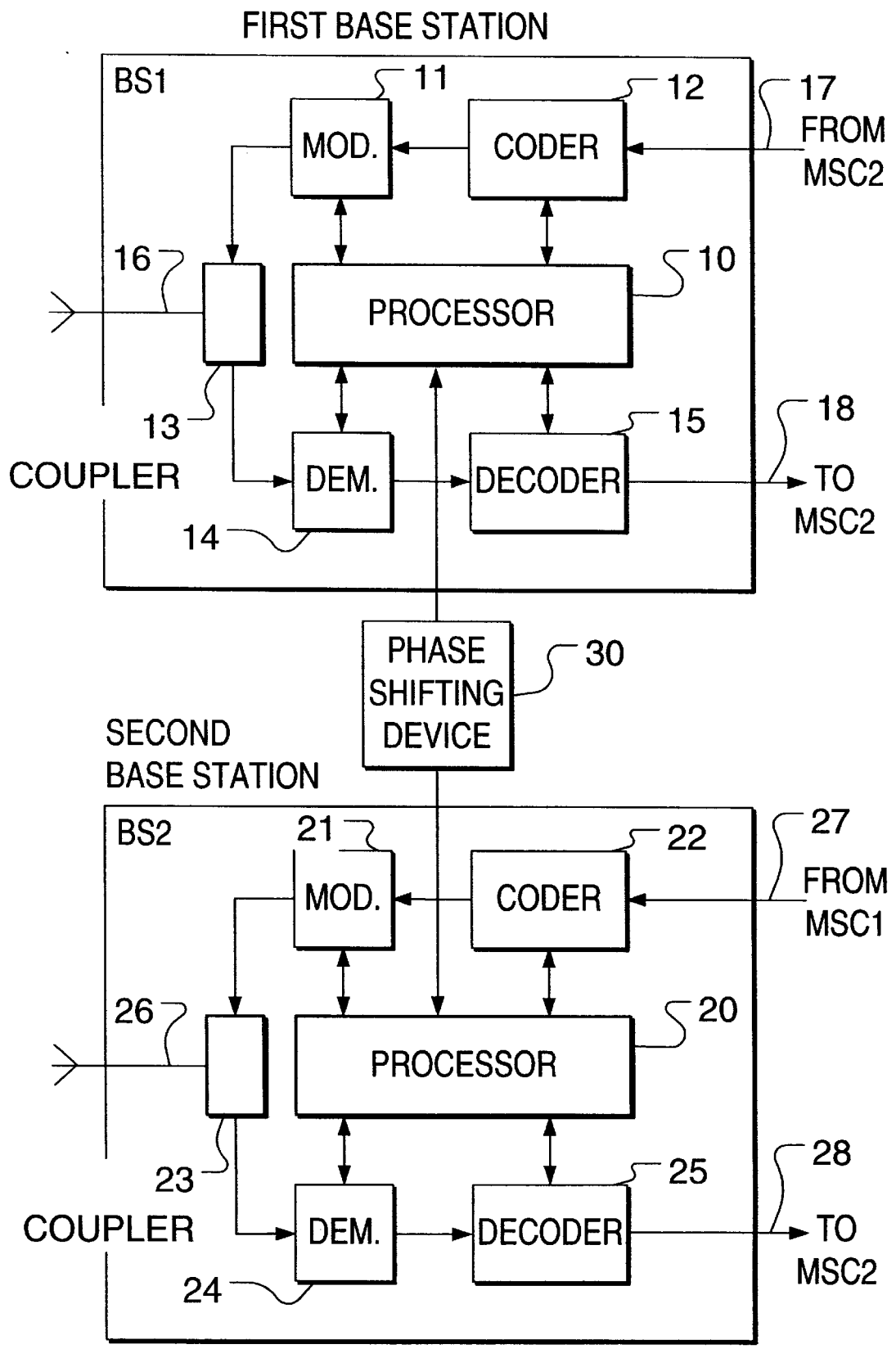

The two radio systems according to the invention as disclosed in FIG. 2 comprise said first base station BS1 including a processor 10 for controlling a coder 12, a modulator 11, a demodulator 14 and a decoder 15, and comprise said second base station BS2 including a processor 20 for controlling a coder 22, a modulator 21, a demodulator 24 and a decoder 25. An input of coder 12 is coupled to an input 17 of BS1 for receiving signals from MSC2, an output of coder 12 is coupled to an input of modulator 11, of which an output is coupled to an input of a coupler 13. An antennae 16 of BS1 is coupled to an in/output of coupler 13, of which an output is coupled to an input of demodulator 14. An output of demodulator 14 is coupled to an input of decoder 15, of which an output is coupled to an output 18 of BS1 for transmitting signals to MSC2. An input of coder 22 is coupled to an input 27 of BS2 for receiving signals from MSC1, an output of coder 22 is coupled to an input of modulator 21, of which an output is coupled to an input of a coupler 23. An antennae 26 of BS2 is coupled to an in/output of coupler 23, of which an output is coupled to an input of demodulator 24. An output of demodulator 24 is coupled to an input of decoder 25, of which an output is coupled to an output 28 of BS2 for transmitting signals to MSC1. Both processors 10 and 20 are mutually coupled via a first coupling comprising a phase shifting device 30.

The telecommunication system according to the invention comprising BS1 and BS2 functions as follows. Processor 10 supplies a first clock signal to coder 12 and modulator 11 as a consequence of which said first channels multiplexed in time are situated in a first frequency band. Processor 20 supplies a second clock signal to coder 22 and modulator 21 as a consequence of which said second channels multiplexed in time are situated in a second frequency band. Due to the fact that said first frequency band and said second frequency band are either equal or close to one another, at least in the overlapping parts of service areas I and II there could be interference. By using said first coupling first between BS1 and BS2, with said coupling first for example comprising phase shifting device 30, at least one of said first and second clock signals can be shifted in phase with respect to the other, thereby reducing said interference. For example a phase shift having a constant value of 90 degrees will offer good results. Phase shifting device 30, of course, is just an embodiment, because of another possibility being the transmission of a data signal from one of the processors to the other, with said data signal indicating the required phase shift to be realized inside a processor or between said processor and the corresponding decoder and modulator or inside said decoder and/or modulator.

The telecommunication system according to the invention comprising BS3 and BS4 with said second coupling that functions in a corresponding way, apart from the phase shift this time having a value which increases all the time. Another possibility which should not be excluded is said phase shift having a value which increases from 0 degrees to for example 180 degrees, and then decreases from said 180 degrees to for example 0 degrees or −180 degrees, and then increases again, etc.

As a consequence of this invention, for example within the range of a first radio system, a second (additional) radio system can be built, using (almost) the same frequency band, which is very advantageous.

According to an other embodiment, said coupling between said first and second radio system is a wireless one, whereby for example said second radio system monitors said first channels of said first radio system and derives said first clock signal from said monitored first channels and generates said second clock signal in response to the derived first clock signal by introducing said predefined phase difference.

In GSM systems having a time slot duration of 577 microsec., a drift of 50 ppm results in 576.97115 microsec., and a shift of one time slot at 20000 time slots corresponds with 11.54 sec. So, said phase shifting device could be realised by for example introducing a fixed or adjustable time delay.

It is of common general knowledge to couple base stations indirectly via an Operational Maintenance Center or OMC, and to couple them directly for synchronization purposes. In both cases, there is no coupling for creating a predefined phase difference between channels of both radio systems. Such a coupling for creating said predefined phase difference will preferably couple two base stations directly, but could also couple them indirectly via for example one or more mobile switching centers.

Of course, coders 12 and 22 could, apart from a coding function, also have further functions, for example a decoding function, and decoders 15 and 25 could, apart from a decoding function, also have further functions, for example a coding function. According to the narrowest scope the term 'radio system' will only comprise a base station or a combination of an antenna and a transmitter, but according to the broadest scope the term 'radio system' will comprise a set of base stations and one or more base station controllers and one or more Mobile Switching Centers or MSCs. Therefore, MSC1 and MSC2 disclosed in FIG. 1 could further be coupled directly instead of via the PSTN and/or could be integrated into one MSC.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. Telecommunication system comprising a first radio system using a first clock signal for defining first channels multiplexed in time, and comprising a second radio system using a second clock signal for defining second channels multiplexed in time, characterized in that the telecommunication system comprises a coupling between the first radio system and the second radio system for creating a predefined phase difference between at least one first channel and at least one second channel by adjusting at least one of said first and second clock signals.

2. Telecommunication system according to claim 1, characterized in that said coupling comprises a phase shifting device.

3. Telecommunication system according to claim 2, characterized in that said phase shifting device alters a phase of at least one of said first and second clock signals with a constant value.

4. Telecommunication system according to claim 2, characterized in that said phase shifting device alters a phase of at least one of said first and second clock signals with a value which is continuously altered in time.

5. Radio system using a clock signal for defining channels multiplexed in time, characterized in that the radio system comprises a coupling for a further clock signal belonging to a further radio system using said further clock signal for defining further channels multiplexed in time for creating a predefined phase difference between at least one channel and at least one further channel by adjusting at least one of said clock signal and said further clock signal.

6. Radio system according to claim 5, characterized in that said coupling comprises a phase shifting device.

7. Radio system according to claim 6, characterized in that said phase shifting device alters a phase of at least one of said clock signal and said further clock signal with a constant value.

8. Radio system according to claim 6, characterized in that said phase shifting device alters a phase of at least one of said clock signal and said further clock signal with a value which is continuously altered in time.

9. Method for providing first radio communication via a first radio system using a first clock signal for defining first channels multiplexed in time, and for providing second radio communication via a second radio system using a second clock signal for defining second channels multiplexed in time, characterized in that the method comprises the steps of supplying at least one of said first and second clock signals to at least one of said second and first radio system respectively, and creating a predefined phase difference between at least one first channel and at least one second channel by adjusting at least one of said first and second clock signals.

10. Method according to claim 9, characterized in that said step of creating said phase difference comprises a substep of altering a phase of at least one of said first and second clock signals with a value.

* * * * *